March 25, 1924.

J. G. MORTON

TRANSMISSION

Filed Jan. 5, 1923

J. G. MORTON

TRANSMISSION

Filed Jan. 5, 1923

J. G. Morton
INVENTOR

BY Victor J. Evans
ATTORNEY

R. E. Wise.
WITNESS:

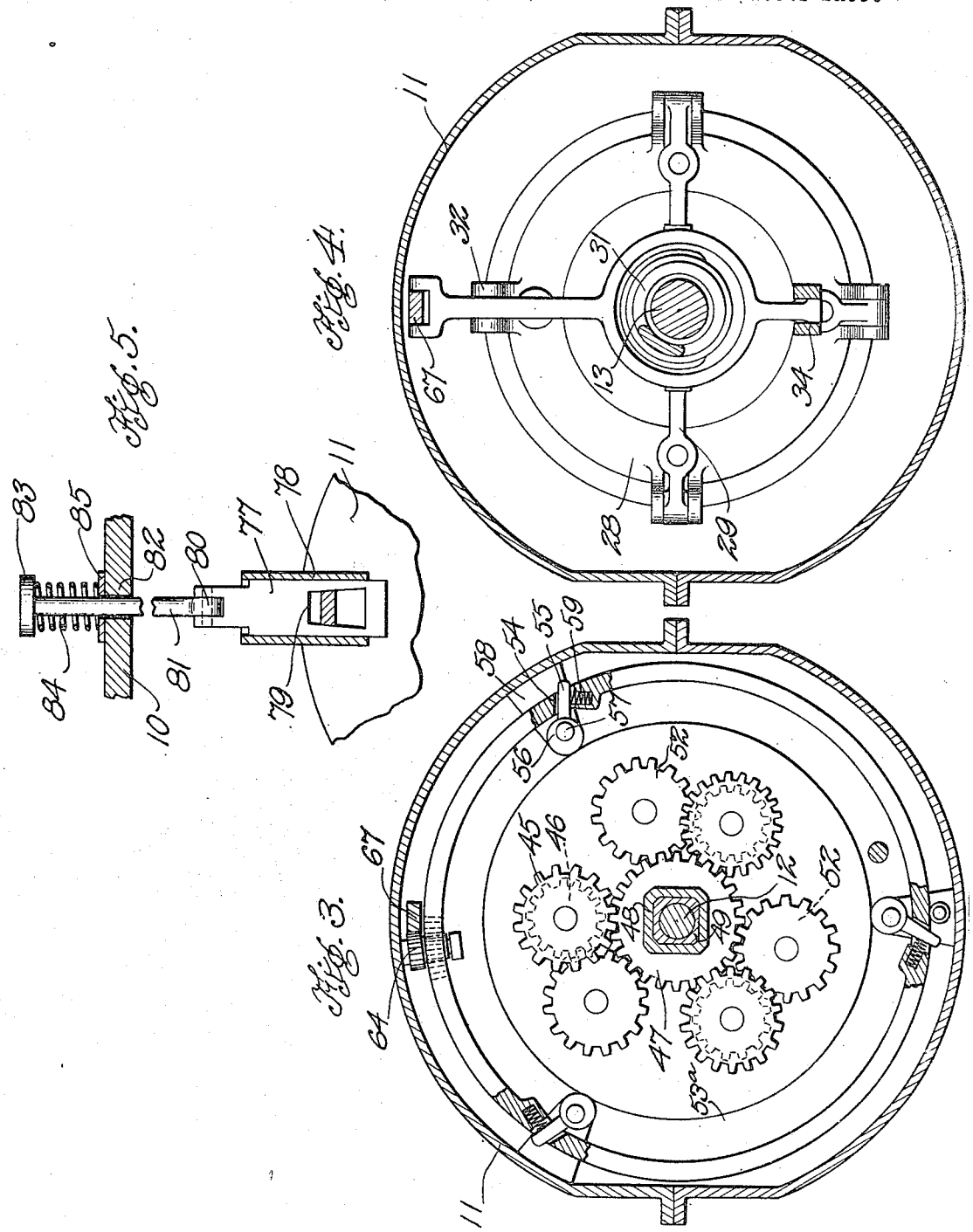

Patented Mar. 25, 1924.

1,488,023

UNITED STATES PATENT OFFICE.

JOHN G. MORTON, OF CHAMPAIGN, ILLINOIS.

TRANSMISSION.

Application filed January 5, 1923. Serial No. 610,832.

*To all whom it may concern:*

Be it known that I, JOHN G. MORTON, a citizen of the United States, residing at Champaign, in the county of Champaign and State of Illinois, have invented new and useful Improvements in Transmissions, of which the following is a specification.

This invention relates to transmission mechanisms and has for an object the provision of a mechanism of this character which includes selective means for controlling the speed and direction of rotation between a drive and a driven shaft, the invention being especially designed for use upon motor driven vehicles.

Another object of the invention is the provision of a variable speed transmission gearing, whereby the speed of rotation between a drive and a driven shaft may be changed while the gears remain in mesh, so that danger of stripping the gears, as frequently occurs during gear shifting, is eliminated.

Another object of the invention is the provision of novel means for controlling the mechanism and for locking the latter in selective position.

With the above and other objects in view, the invention further includes the following novel features and details of construction, to be hereinafter more fully described, illustrated in the accompanying drawings and pointed out in the appended claims.

In the drawings:—

Figure 2 is an enlarged longitudinal sectional view through the mechanism per se.

Figure 3 is a section on the line 3—3 of Figure 2.

Figure 4 is a similar view on the line 4—4 of Figure 2.

Figure 5 is an enlarged detail section on the line 5—5 of Figure 2.

Figure 6 is a fragmentary perspective view illustrating the engaging means between the controlling rod and one of the brake rings.

Figure 1:
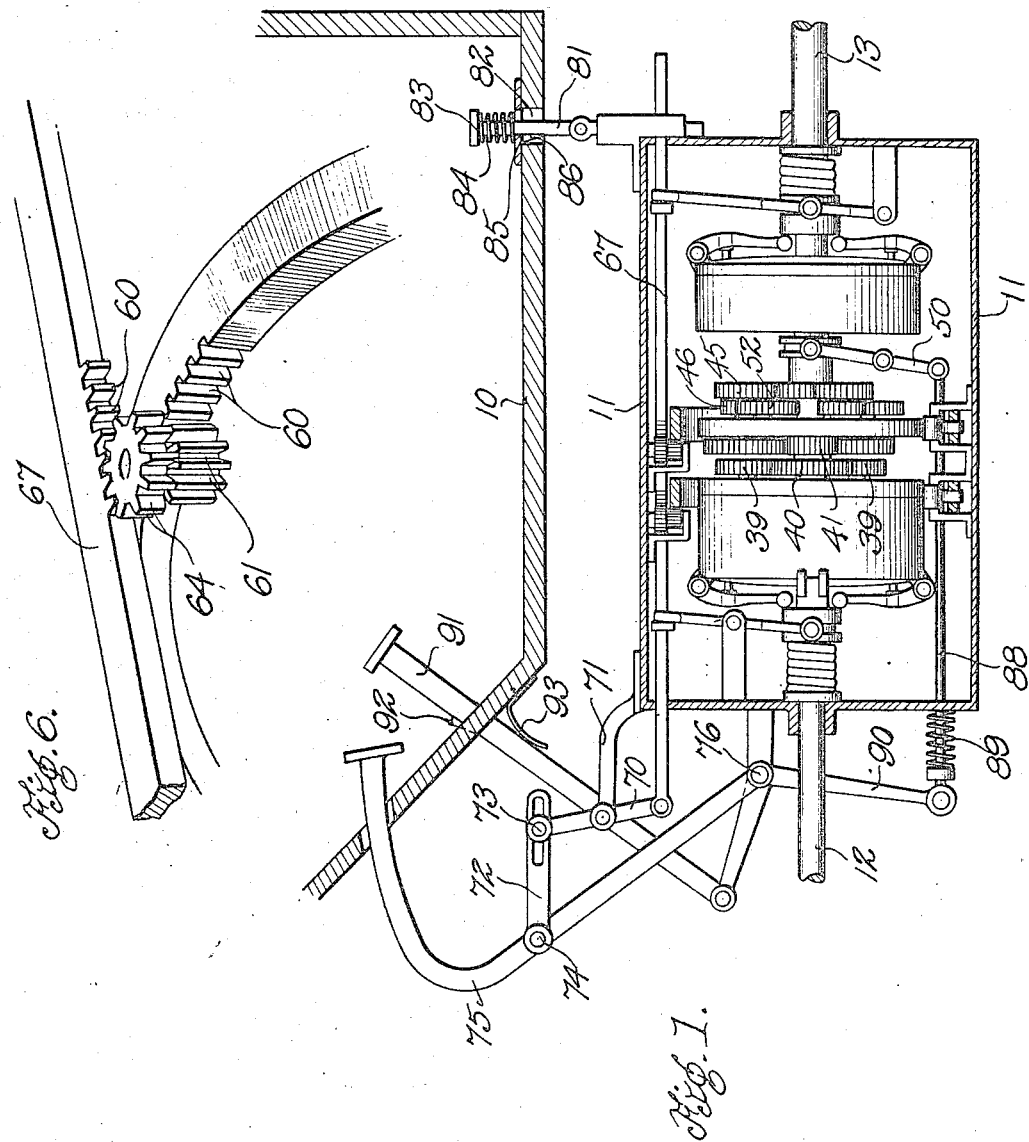
Figure 1 is a sectional view through the transmission housing and a portion of the floor of an automobile and illustrating the transmission mechanism controlling means.

Referring in detail to the drawings, wherein like characters of reference denote corresponding parts, the reference character 10 indicates a portion of the floor of an automobile, beneath which is mounted in any suitable manner the transmission mechanism which is positioned within a housing 11. This mechanism includes a drive shaft 12 which may be connected to the engine of the automobile by a clutch (not shown) and this clutch may be operated to disconnect the shaft 12 from the engine when it is desired to place the mechanism in a neutral or inactive position. The mechanism further includes a driven shaft 13 which may be connected in any suitable manner to the differential mechanism of the automobile.

The shafts 12 and 13 extend within the opposite ends of the housing 11 and are mounted in suitable bearings, the inner end of the shaft 12 extending into and rotating within the inner socketed end 14 of the shaft 13.

Mounted for free rotation upon the shaft 12 is a clutch housing 14', while located within this housing and keyed to the shaft 12 is a drum 15. Positioned between the outer periphery of this drum and the inner wall of the clutch housing 14' is a plurality of clutch disks 16 which are designed to provide a locking means between the housing 14' and the drum 15 so that the said housing may be caused to rotate with the drum. For this purpose there is provided a clutch ring 17 which is adapted to engage the outer disk 16 and which carries arms 18. These arms extend through the clutch housing 14' and engage pivotally mounted arms 19 and the latter are in turn engaged by a collar 20 which is slidably and rotatably mounted upon a sleeve 21 which extends from the clutch housing 14' and which surrounds the shaft 12. A spring 22 acts to force the collar 20 inward toward the clutch housing and to actuate the arms 18 to normally engage the clutch. The clutch collar 20 is engaged by a bifurcated lever 23 which is pivotally mounted as at 24 upon a bracket arm extending from one end of the housing 11.

The inner end of the shaft 13 has secured thereto a clutch housing 24 and this housing, like the housing 14', contains a drum 25 which is keyed to the shaft 12 and clutch disks 26 which are forced together by a ring 27 carried by arms 28.

These arms extend through the housing 24 and are connected to pivotally mounted arms 29 which are engaged by a collar 30 slidable on the shaft 13. The collar 30 is forced inward toward the clutch housing 24' by a spring 31 and is engaged by a lever 32 which is pivotally mounted as at 34 upon a bracket arm extending from the opposite end of the housing 11. The clutches are thus both normally in engaged position due to the influence of the springs 22 and 31.

For convenience of description, the clutch which is mounted upon the shaft 12 will be designated A and the clutch whose housing is carried by the shaft 13 will be designated B.

The clutch A has its housing 14' provided with a compartment 35 and located within this compartment and keyed to the shaft 12 is a main driving pinion 36. This pinion meshes with gears 37 which are secured upon the inner end of shafts 38 and the said shafts are mounted in bearings provided in the end of the housing 14'. Also secured upon the shafts 38 are gears 39 and these last mentioned gears mesh with a gear 40 which is freely rotatable upon the shaft 12 and which has secured to one face thereof a pinion 41.

Mounted for free rotation upon the shaft 12 is a disk 42 which provides a bearing for a plurality of shafts 43. The shafts 43 have secured thereon gears 44 which are engaged by the pinion 41 and these shafts also have secured thereon double gears 45 and 46 of different diameters. The gears 45 are adapted to engage the gear 47 which is capable of sliding movement upon the shaft 12 and which is provided with a hub 48 having a transversely rectangular socket therein for the reception of a similarly shaped sleeve 49 which extends from the stationary end of the clutch housing 24' of the clutch B. The hub 48 is provided with an annular groove for connection with the free end of a lever 50 and the latter is pivotally mounted as shown at 51.

As seen from the foregoing description and accompanying drawings, the gears 44, 45 and 46 are carried by the disk 42, while also carried by this disk are gears 52 which are located substantially upon the same vertical plane as the gears 46 and are so positioned that the gear 47 when slidingly moved may be brought into engagement with the gears 45 or the gears 52 as desired, this engagement being effected by the operation of the lever 50 which is controlled by means to be hereinafter described.

Surrounding the housing 14' of the clutch A is a ring 53, while a similar ring 53ª surrounds the brake plate 42 and as the rings are of like construction only one will be described. These rings contain openings 54 which receive fingers 55 carried by eccentrics 56, the latter being rotatably mounted as shown at 57 upon brackets 58 extending inwardly from the housing 11. Springs 59 which are seated within sockets provided in the rings, engage the fingers 55. The rings are further provided along one edge with teeth 60 and these teeth are engaged by idlers 61 which are mounted upon short shafts. One of the ends of these shafts is mounted in bearing brackets 62 extending from the casing, while the opposite ends of the said shafts are mounted in bearings 63 carried by the casing. The pinions 61 are secured to or formed upon pinions 64 and these pinions engage spaced sets of teeth 65 and 66 which are carried by a longitudinally movable controlling rod 67.

The rod 67 extends longitudinally through the casing 11 and is provided with spaced stops 68 and 69 which are adapted to engage respectively with the levers 23 and 32.

The rod 67 extends through the opposite ends of the housing 11 and one end of this rod is pivotally connected to one end of a rocker arm 70 which is pivotally mounted upon a bracket 71 extending from the housing 11. The opposite end of the rocker arm 70 has a pivotal and adjustable connection with one end of a link 72, as shown at 73 and this link is pivotally mounted as at 74 upon a gear shift pedal 75, which is in turn mounted for pivotal movement as at 76.

By operating the foot pedal 75, the rod 67 may be moved longitudinally within the casing and in order to hold this rod against accidental movement, there is provided a plunger 77 which is mounted for sliding movement in a guide 78 carried by the housing 11. This plunger is provided with a substantially wedge-shaped slot 79 whose opposite inclined edges are adapted to frictionally engage the opposite edges of the rod 67 to hold the latter against movement. The upper end of the plunger 77 is pivotally secured as at 80 to the inner end of a plunger rod 81, the latter extending upwardly through an opening 82 provided in the floor 10 and having a head 83 thereon. A spring 84 is interposed between this head and a plate 85 secured to the floor 10 and the plunger rod carries a beveled lug or tooth 86 which is adapted to engage beneath the plate 85 when the rod is depressed to hold the plunger in engagement with the rod 79.

Pivotally secured to the lever 50 as shown at 87 is a longitudinally movable rod 88 which extends through the housing 11 and is forced in one direction by the action of a spring 89. The outer end of the rod 88 is pivotally connected to a bell crank lever 90 and the latter is in turn pivotally connected to a reverse pedal 91 which extends through the floor of the automobile. This pedal is provided with a beveled lug or tooth 92 for engagement with the lower edge of the floor and this tooth is yieldingly held in such engagement by means of a spring 93.

Assuming that the shaft 12 is in operation, the foot pedal 75 may be forced downwardly to move the controlling rod 67 rearwardly, this operation releasing the clutches A and B through the engagement of the stops 68 and 69 with the levers 23 and 32. This movement of the rod 67 will, through the gears 64 and teeth 65 and 66, rotate the brake rings 53 and 53ª so as to position the eccentrics 65 substantially as shown in Figure 3 of the drawings. The mechanism will then be in first or low speed position, the drive being through the pinion 36, the gears 37 and 39, the gears 40, 41, 44, 45 and 47, the sliding connections 48 and 49 to the housing 24 of the clutch B and to the shaft 13, the gearing just described reducing the relative speed of rotation between the shafts 12 and 13.

By permitting the rod 67 to move forward under the action of the clutch springs, the clutch A will be engaged, due to the difference in the pivotal mounting of the levers 23 and 32. The clutch A will then rotate with the shaft 12 and the drive will be from clutch A through reducing gears so that the shaft 13 will still be rotated at a less speed than the shaft 12, but this speed will be at an increase over the former rate of rotation. A further movement of the rod 67 will let in the clutch B, so that both the clutches A and B will be locked to the shaft 12 and the speed of rotation between this shaft and the shaft 13 will be the same. When the mechanism is operating in first or low speed, tendency of the housing 14' of the clutch A and the brake plate 42 to rotate, will be arrested by the eccentric locking members 56, direction of such tendency being in the direction of the arrow shown in Figure 3.

It will be seen from the foregoing description that the mechanism may be shifted into first or low speed, second or intermediate speed and into third or high speed with the gears all remaining in mesh, so that the change of speed may be effected smoothly and without danger of gear stripping.

By operating the reverse pedal 91, the rod 88 may be moved inwardly to regulate the lever 50 upon its pivot and slide the gear 47 from engagement with the gears 45 into engagement with the gears 52 so as to operate the shaft 13 in a direction reverse from the direction of operation of the shaft 12.

The invention is susceptible of various changes in its form, proportions and minor details of construction and the right is herein reserved to make such changes as properly fall within the scope of the appended claims.

Having described the invention what is claimed is:—

1. A transmission mechanism comprising in combination with a drive shaft and a driven shaft, a clutch mounted upon each shaft, spring actuated means for locking each of the clutches to its respective shaft, gears connecting the drive shaft and clutch, selective means whereby the clutches may be operated to release one or both of said clutches, means operated by the selective means to control the operation of the gears and control the relative speeds of rotation of the shafts, means whereby the direction of rotation of the driven shaft may be regulated and means for locking the selective means in position.

2. A transmission mechanism comprising in combination with a drive shaft and a driven shaft, a clutch mounted upon each shaft, spring means for locking each of the clutches to its respective shaft, gears connecting the drive shaft and clutch, selective means including a brake mechanism, whereby the clutches may be operated to release one or both of said clutches, means operated by the selective means to control the operation of the gears and control the relative speed of rotation of the shafts and means for locking the selective means in position.

3. A transmission mechanism comprising in combination with a drive shaft and a driven shaft, a clutch mounted upon each shaft, spring actuated means for locking each of the clutches to its respective shaft, gears connecting the drive shaft and one of the clutches, a brake mechanism for controlling the operation of the gears, means for releasing the clutches and manually operated means for operating the brake mechanism and selectively controlling the clutch releasing means.

4. A transmission mechanism comprising in combination with a drive shaft and a driven shaft, a clutch mounted upon each shaft, spring means for locking the clutches to their respective shafts, gears connecting the drive shaft and one of the clutches, a brake mechanism for controlling the operation of the gears, means for releasing the clutches, manually operated means including a longitudinally movable controlling rod engageable with the brake mechanism for controlling the operation of the latter and means engaged by the manually operated means to control the operation of the clutches.

5. A transmission mechanism comprising in combination with a drive shaft and a driven shaft, a clutch mounted upon each shaft, means for controlling the clutches, whereby the drive shaft will operate the driven shaft, selectively operated gearing interposed between the clutches and independently operated selectively controlled brake mechanisms including brake rings, a controlling rod common to the rings of both mechanisms and gearing connecting said rod and rings, whereby the brake mechanisms may be selectively operated to control the relative speeds of the shafts.

6. A transmission mechanism comprising in combination with a drive shaft and a driven shaft, a clutch mounted upon each shaft, means for controlling the clutches, whereby the drive shaft will operate the driven shaft, selectively operated gearing interposed between the clutches and independently operated selectively controlled brake mechanism including brake rings, eccentric locking members carried by said rings and operable to control the operation of the gears and regulate the relative speeds of the shafts, a controlling rod common to the rings of both brake mechanisms and means operatively connecting said rod and rings, whereby the latter may be selectively operated.

7. A transmission mechanism comprising in combination with a drive shaft and a driven shaft, a clutch mounted upon each shaft, means for controlling the clutches, whereby the drive shaft will operate the driven shaft, selectively operated gearing interposed between the clutches, independently operated selectively controlled brake mechanisms including a longitudinally movable rod for controlling the relative speeds of the shafts and means engageable with the rod to hold the latter in position.

In testimony whereof I affix my signature.

JOHN G. MORTON.